Jan. 19, 1965 A. C. REID 3,166,722
BALANCED AMPLITUDE MODULATOR
Filed June 1, 1961
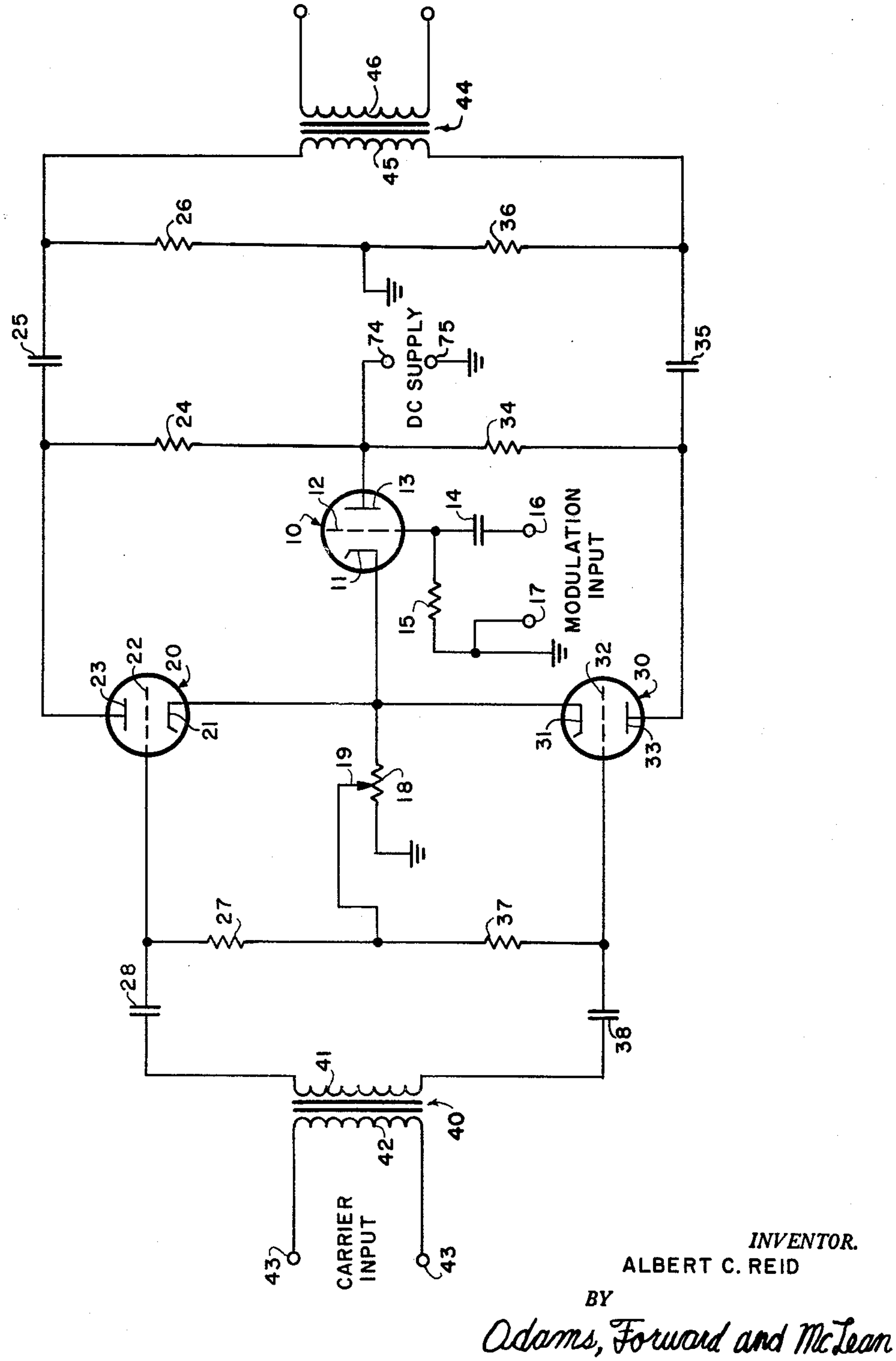
INVENTOR.
ALBERT C. REID
BY
*Adams, Forward and McLean*
ATTORNEYS

3,166,722
BALANCED AMPLITUDE MODULATOR

Albert C. Reid, Tulsa, Okla., assignor, by mesne assignments, to Sinclair Research, Inc., New York, N.Y., a corporation of Delaware Filed June 1, 1961, Ser. No. 114,190
2 Claims. (Cl. 332—43)

My invention relates to modulation and in particular provides an amplitude modulator.

In my copending application Serial No. 683,164, filed September 10, 1957, now abandoned, I have described a method and apparatus for producing seismic cross-section displays in which a seismic signal is displayed as the wave envelope of a low frequency carrier amplitude modulated by the seismic signal to be displayed. Typically, the cross-sections are prepared by modulating a carrier having a frequency on the order of 1200 cycles per second which is then directly coupled to an oscillograph to prepare a recording of the amplitude modulated carrier. Even after substantial volume compression, however, the power level of the seismic signals in a given recording may vary on the order of 20 to 40 decibels and accordingly attention must be paid to the design of the modulator employed in order to avoid distortion at relatively high signal power levels while still obtaining modulation response to low power level signals.

It is therefore an important object of my present invention to provide an amplitude modulation device suitable for modulating a low frequency carrier by a signal having a wide power level range having particular utility in the production of seismic cross-section displays in accordance with my aforesaid copending application. It is a further object of my present invention to provide such a modulator in which distortion of the modulated output carrier is avoided even at relatively high modulating signal power levels while assuring response to relatively low amplitude modulating signal power levels.

In accordance with these objects, my present invention basically includes a balanced, push-pull, electron tube, modulated amplifier having a cathode impedance across which modulation signal is coupled, preferably by a cathode-follower, electron tube, signal amplifier with cathode circuits of the two amplifiers having a common cathode impedance, the carrier being impressed across the control electrodes of the electron tubes in the push-pull modulated amplifier. Intermediate the ends of the cathode impedance, connections are made to the control electrodes of the electron tubes in the push-pull, modulated amplifier, such that the cathode impedance not only serves to provide D.C. bias for the modulated amplifier but also serves to couple a portion of the modulating signal to the control electrodes of the electron tubes in the modulated amplifier in the opposite sense of the coupling of such signal to the cathodes of the modulated amplifier tubes.

It will be apparent that in a balanced, push-pull modulated amplifier, if the modulating signal amplitude is relatively high, the electron tubes of the amplifier can be driven past cut-off or can draw grid current, thus producing undesirable distortion in the output modulated carrier. In accordance with my present invention, the coupling of a portion of the modulating signal to the grids, i.e., control electrodes of the modulated amplifier tubes, functions to inhibit such occurrence.

For a more complete understanding of the practical application of my invention reference is made to the appended drawing, which is a schematic diagram of a modulator in accordance with my present invention.

Referring to the drawing, my invention basically includes a signal amplifier including a triode 10 and a modulated amplifier including a pair of triodes 20 and 30. Triodes 10, 20 and 30 are vacuum tube triodes and include cathodes 11, 21 and 31, respectively, control grids 12, 22 and 32, respectively, and anodes 13, 23 and 33, respectively.

Cathodes 21 and 31 are interconnected to one end of a cathode impedance, e.g., resistor 18, which is a potentiometer connected to ground at its other end and having a wiper tap 19. Control grid 22 is connected to carrier blocking resistor 27 and coupling capacitor 28 and control grid 32 is connected to carrier blocking resistor 37 and coupling capacitor 38. The bias on control electrodes 22 and 32 is equal to the direct current potential between tap 19 on resistor 18 and the end of that resistor connected to cathodes 21 and 31, since tap 19 is connected to resistors 27 and 37 at their ends remote from control electrodes 22 and 32, respectively. Thus, the biasing circuit for triode 20 includes cathode 21 connected through cathode resistor 18 to tap 19 which is connected to control electrode 22 through resistor 27. The biasing circuit for triode 30, which is analogous to that for triode 20, includes cathode 31 connected through resistor 18 to tap 19 which is connected to control electrode 32 through resistor 37.

The output of an oscillator circuit providing a carrier signal is connected to terminals 43, 43 of primary winding 42 of step-up transformer 40. The secondary 41 of the transformer 40 is connected to control electrodes 22 and 32 through coupling capacitors 28 and 38, respectively. Because resistors 27 and 37 are large in comparison with the resistance of resistor 18 and the reactance of capacitors 28 and 38, a large proportion of the output voltage appearing across the secondary 41 of the transformer 40 appears with opposite polarities between the control electrodes 22 and 32, and the cathodes 21 and 31 respectively. This carrier signal is balanced with respect to ground and the control electrodes by the voltage dividing characteristics of the circuit including the secondary winding 41 of the transformer 40, capacitors 28 and 38, resistors 27 and 37, and the cathode resistor 18 connected between ground and the cathodes 21 and 31, as capacitors 28 and 38 are selected to have equal capacity and resistors 27 and 37 to have equal resistance.

The anode supply circuits for anodes 23 and 33 include connections through resistors 24 and 34 respectively to the positive terminal 74 of an anode supply voltage source, of which the negative terminal 75 is connected through ground and the cathode resistor 18 to cathodes 21 and 31 completing the anode supply circuits.

The modulation input signal is impressed upon the push-pull amplifier through cathode resistor 18 of the cathode-follower amplifier including triode 10 and resistor 18. Cathode 11, which is connected to ground through resistor 18, is interconnected with cathodes 21 and 31 at one end of cathode resistor 18. Control electrode 12, which is isolated from ground by a resistor 15, is connected through a capacitor 14 to one terminal 16 of the modulation input signal source, the other terminal 17 of which is connected to ground. Anode 13 of the cathode-follower triode 10 is also connected to the anode supply terminal 74 to maintain a potential across triode 10 and cathode resistor 18.

In the output circuit, the modulated signal appears across anodes 23 and 33 which are connected to opposite terminals of the primary winding 45 of output transformer 44, through capacitors 25 and 35, respectively. Resistors 26 and 36 having approximately equal resistances interconnect opposite terminals of primary winding 45 and ground to balance the modulated output signal with respect to the ground.

Modulation of balanced modulators is effected by several well known methods (see H. J. Reich, Theory and Application of Electron Tubes, Second ed., 1944, pp. 291–292). However, in this circuit, modulation may best be described as a combination of grid and cathode modulation which is not described by Reich. Nevertheless, by following the reasoning outlined by Reich, it can be understood that the modulation frequency will not appear in the modulated output signal at the secondary 46 of transformer 44, and that the carrier and the side-band frequencies will appear in the output signal. This may be explained most simply by analyzing the phase-shift of signals introduced at different points in the circuit with different polarity relationships with respect to reference points such as the control electrodes. Although the carrier signal is impressed across the control electrodes 22 and 32 so that they are 180 degrees out of phase, the modulated output signal will include the carrier frequency since the carrier signal components appear 180° out of phase across the output transformer after the 180 degree phase-shift in the triodes of the push-pull amplifier. The modulation frequency will not appear in the output, because the output components of the signal which are introduced with like phase and amplitude to the cathodes and control electrodes of triodes 20 and 30 have equal phase and amplitude at opposite ends of the output transformer 44.

To understand the operation of this circuit one must recognize the unusual mode of operation of cathode resistor 18 which serves several functions simultaneously. Amplitude modulation, which is most simply effected by changing the effective operation point of the electron space discharge device instantaneously in response to the amplitude of the modulation signal, is effected in this circuit by changes in modulation input potential which vary the potential of the control electrode 12 and the potential of cathode 11 in accordance with typical cathode-follower operation. Triode 10 and resistor 18 are connected in cathode-follower relationship, so that the potential of cathodes 21 and 31 is varied with respect to ground in response to changes in modulation signal input potential, resulting in simultaneous variation of effective anode supply potential and effective bias changing the operating points of the triodes 20 and 30 which must have substantially identical characteristics. Because of the voltage dividing action of cathode resistor 18 through point 19 to control electrodes 22 and 32, a predetermined proportion of modulation signal is caused to alter the effective control electrode bias. The amount of change of effective bias produced is less than that which would occur if simple cathode modulation were employed in a self-biased amplifier. When maximum positive signal potential is introduced at terminal 16, operation of the cathode-follower amplifier causes cathodes 11, 21 and 31 to rise in potential due to the IR drop across cathode resistor 18. The position of tapping point 19 may be so selected that for maximum positive input signals the increase in effective bias on the control electrodes of triodes 20 and 30 will be a small proportion of the amplitude of the carrier signal to be amplified by triodes 20 and 30. Thus, the effective bias may be predetermined for a given maximum modulation input signal so that the modulated envelope will reach a minimum node only when maximum modulation input potential is reached.

On the other hand, when a large instantaneously negative signal is applied to terminal 16 causing the cathode-follower triode 10 to approach cut-off or to conduct little current, the potential across cathode resistor 18 will be reduced, causing larger amounts of current to flow through triodes 20 and 30 due to the proportional decrease in bias thereon counterbalancing the change in potential across cathode resistor 18. Triodes 20 and 30 will be self-biased during such intervals. Such self-biasing prevents flow of grid current through control electrodes 22 and 32. This circuit attenuates the modulation input signal potential, and minimizes blocking of the carrier signal or grid current flow. At one extreme, the output signal will be modulated to maximum positive potential without grid current and at the other extreme it will approach zero without overloading thereby eliminating attendant distortion of the peaks and valleys of the modulated signal.

This circuit is particularly useful for applications requiring output of modulated carrier signals including the carrier frequency and side-band frequencies, when it is desired to produce a graphic display of the wave form of the modulation input signal.

I have successfully tested a particular embodiment of the circuit shown in the drawing using a carrier signal of 350 millivolts grid to grid with a frequency of 1200 cycles per second, a modulation frequency between 10 cycles per second and 400 cycles per second with a variation in modulation input signal amplitude between 0 millivolts and 580 millivolts, including a 12AX7 double triode connected in push-pull, a 12AY7 triode connected as a cathode-follower, and a cathode resistor including a 2.5K adjustable tap potentiometer from which the top connection to the grids is taken connected to ground through a 2.7K resistor and to the cathodes by a 4.7K resistor. In addition, the push-pull amplifier tested included two 470K carrier blocking resistors and two 0.005 microfarad carrier coupling capacitors in the input circuits; two 150K load resistors in the power supply circuit; two 680K resistors and two 0.001 microfarad signal coupling capacitors in the output circuits, and a regulated power supply potential of 150 volts D.C. The test results indicated a minimum of distortion in the output signal.

A particular use for this type of modulator is related to seismic prospecting, providing an improved method of displaying signals detected by a geophone actuated by a seismic shock wave. A well known system in which this improvement is to be used includes a geophone used to drive a galvonometer movement, to which is affixed a reflecting mirror so that deflection of the movement causes a point source of light reflected by the mirror to be deflected in proportion to the amplitude and frequency of the signal. A record of the position of the reflected line is made upon a continuously moving strip of photographic paper. In geophysical exploration, the location of faults and interfaces between layers of earth is indicated by non-linearities in a seismic signal showing the approximate positions and depths of faults and gradients of interfaces within the sub-surface of the earth. As explained in my aforesaid copending application, a graphic display of a seismic wave envelope, produced by modulating the carrier wave with the seismic signal, facilitates recognition of the presence of geological faults and interfaces.

I claim:

1. A balanced push-pull modulator including a pair of electron space discharge devices, each including a cathode, a control electrode, and an anode, an impedance connected at one end thereof to said cathodes, means connected to each said anode and the other end of said impedance for impressing anode supply potential on each said anode, a carrier signal input circuit coupled to said control electrodes of said balanced modulator, said control electrodes being coupled to a point intermediate the ends of said impedance, the portion of said impedance between said one end connected to said cathodes and said point intermediate the ends of said impedance being the cathode bias impedance of said electron space discharge devices, means for coupling an input signal across said impedance, and an output circuit coupled across said anodes of said balanced modulator.

2. A balanced push-pull modulator including a pair of electron space discharge devices, each including a cathode, a control electrode, and an anode, an impedance connected at one end thereof to said cathodes, means connected to each said anode and the other end of said impedance for impressing anode supply potential on each said anode, a carrier signal input circuit coupled to said control electrodes of said balanced modulator, said control electrodes being coupled to a point intermediate the ends of said impedance, the portion of said impedance between said one end connected to said cathodes and said point intermediate the ends of said impedance being the cathode bias impedance of said electron space discharge devices, a cathode-follower amplifier including a third electron space discharge device, said device including a third cathode, a third control electrode, and a third anode, said impedance being the cathode load of said cathode-follower amplifier and being connected at said one end of said impedance to said third cathode, means connected to said third anode for impressing anode supply potential on said third anode, a modulation signal input circuit, said modulation signal input circuit being coupled across said third control electrode and said other end of said impedance, and an output circuit coupled across the anodes of said balanced modulator.

References Cited in the file of this patent

UNITED STATES PATENTS

| | | |
|---|---|---|
| 2,129,313 | Whitelock | Sept. 6, 1938 |
| 2,399,586 | Toomin | Apr. 30, 1946 |
| 2,832,051 | Raisbeck | Apr. 22, 1958 |